Patented Dec. 26, 1922.

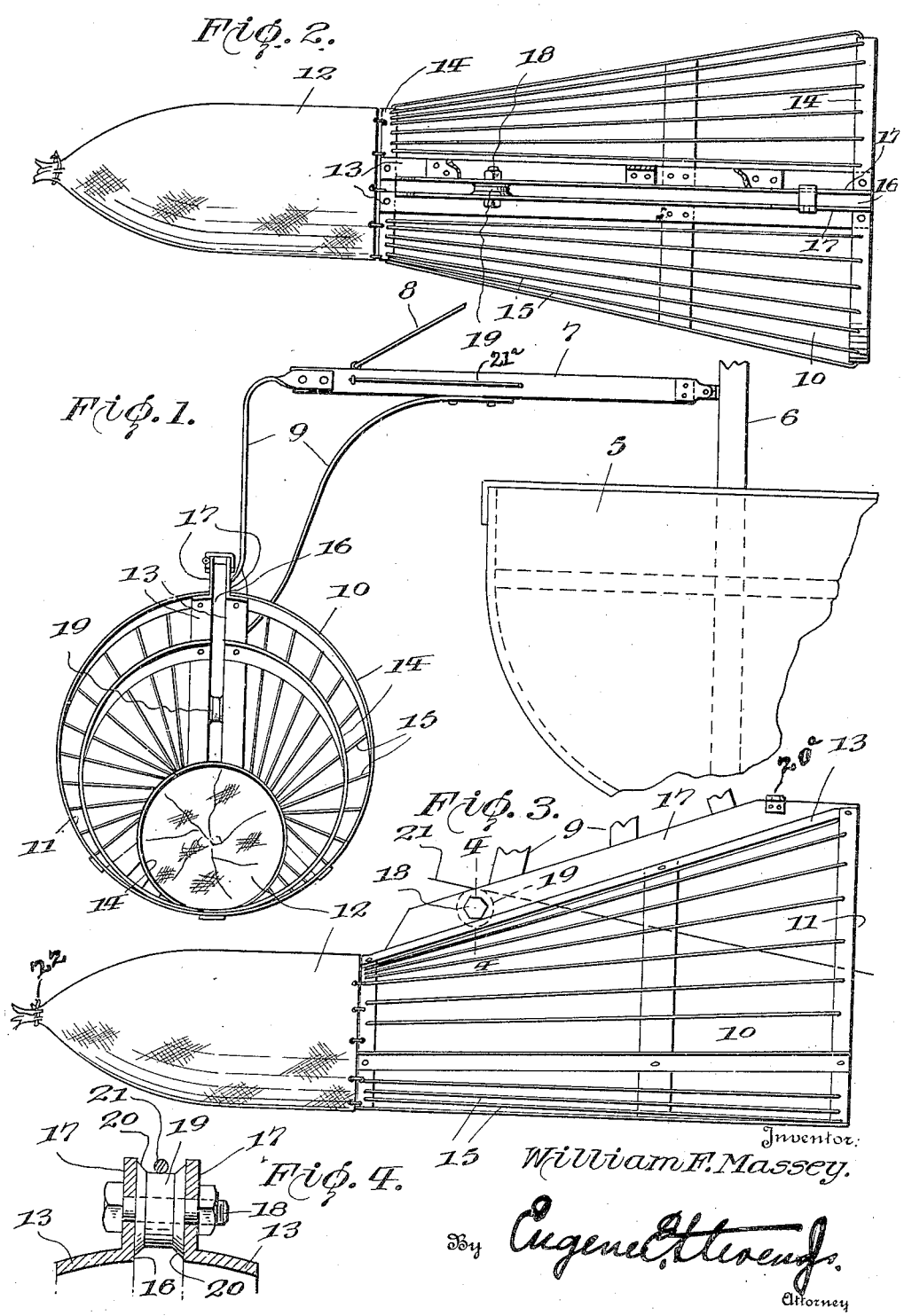

1,439,908

UNITED STATES PATENT OFFICE.

WILLIAM F. MASSEY, OF CLARENDON, VIRGINIA, ASSIGNOR OF ONE-THIRD TO JOHN W. MASSEY, JR., AND ONE-THIRD TO JOSEPH FOSTER MASSEY, BOTH OF WASHINGTON, DISTRICT OF COLUMBIA.

FISHING NET.

Application filed February 25, 1922. Serial No. 539,113.

*To all whom it may concern:*

Be it known that I, WILLIAM F. MASSEY, a citizen of the United States, residing at Clarendon, in the county of Arlington and State of Virginia, have invented certain new and useful Improvements in Fishing Nets, of which the following is a specification.

My invention relates to fishing nets and more particularly to a net which is especially adapted for use in removing crabs and other crustacea from trot lines.

In the crab fishing industry it is customary to employ trot lines of considerable length which lie along or in proximity to the bottom and are anchored and buoyed at either end. Bait in the form of meat is knotted to the line at intervals for attraction of the crabs, and to which they attach themselves as they feed. The most common mode of taking the crabs from the line is by means of hand nets, the line being raised to or near the surface of the water by the fisherman passing along the line in a boat and the crabs clinging to the bait being dipped into the boat by means of a hand net before they can release their hold on the bait. This method is very slow and tedious, and it is therefore the principal object of my invention to provide a net which is capable of attachment to a hand or power propelled boat and which will automatically remove the crabs from the line as the boat is moved through the water.

A further object of the invention is the provision of a novel and improved crab net having a means therein whereby the crabs may be stripped from the line and effectually prevented from thereafter escaping.

A still further object of the invention is to provide a net of the kind stated which is simple in construction, highly efficient in the use for which it has been designed, and which may be manufactured at a relatively small cost.

With the above and other objects in view, as will become more apparent as the description proceeds, the invention comprises a novel combination and arrangement of parts to be hereinafter described and claimed, and in order that the same may be better understood, reference is had to the accompanying drawing, forming a part of this specification, and in which the preferred embodiment of the invention is disclosed.

In the drawing,

Figure 1 is a front elevation of my device showing one mode of attachment to a boat;

Fig. 2 is a plan view of the device;

Fig. 3 is a side elevation, and

Fig. 4 is a sectional detail taken on the line 4—4 of Fig. 3.

Referring now to the drawing, wherein like reference characters designate like parts throughout the several views, numeral 5 designates a portion of a boat having a mast 6 and a boom 7 which is supported by the usual hoisting line 8. At the free end of the boom 7 there is secured by means of depending supporting brackets 9, a net 10 of substantially cylindrical form having at one end a flared mouth 11 from which the walls taper inwardly to the rear of the net at which point a bag or other mesh container 12 is fastened in any preferred manner for communication with the net. The net 10 comprises a pair of spaced longitudinal angle strips 13 to which the supporting brackets 9 are riveted or otherwise secured and from which sheet metal hoops 14 depend. With the angle strips 13 and the depending hoops 14 as a frame the longitudinally disposed wires 15 are applied to complete the structure of the net.

By this construction it will be seen that I have provided a strong and durable net formed with a longitudinal slot 16 between the upstanding flanges 17 of the spaced angle strips 13 the purpose of which will be presently described. In the slot 16 there is rotatably secured by means of a bolt 18 passing through apertures in the flanges, a pulley 19 having beveled side flanges 20 adjacent the angle strips 13 and in close proximity thereto. This slot 16 is adapted to receive the trot line 21 which passes rearwardly over the pulley 19, and if desired a latch member 21ª may be used to prevent the line from becoming disengaged from the slot.

Having described my invention, the operation is as follows:—

The device being secured to the boom of the boat, as shown, is lowered into the water and the trot line is raised and placed into the slot 16 and over the pulley 19. A line 21ª is secured to the bow of the boat from the free end of the boom 7 to hold it in position. The boat is then propelled along the line which is raised by the pulley 19 as best shown in Fig. 3. The crabs clinging to the bait are raised and stripped from the line into the net 10 from which they are precipitated into the bag 12. The pulley 19 may be located at any point rearwardly of front of the groove but I have found it preferable to use it at a point in proximity to the rear end of the groove 16. By this arrangement the crabs are prevented from escaping in the event that they release their hold before they reach the pulley 19. This is a distinct advantage as will be readily seen and the crabs will be safely within the net 10 before they sense the vibration of the line and a considerable distance before the surface of the water is reached. When the end of the line is reached the device may be hoisted onto the boat and the crabs deposited into a box or container by untying the draw strings 22 of the bag 12.

While I have described the preferred embodiment of my invention, it will be understood that I reserve the right to make various changes and modifications in the same which are within the spirit and scope of the depended claims.

I claim:

1. A device of the character described comprising a frame open at either end, network covering said frame, a guide within said frame for the passage of a line, and a receptacle secured to one end of said frame and in communication therewith.

2. A device of the character described comprising a frame having a mouth at one end and a longitudinal guide within said frame, and a net-work covering for said frame.

3. A device of the character described comprising a frame open at either end, said frame having a longitudinal slot therein, and a receptacle secured to one end of said frame and in communication therewith.

4. A device of the character described comprising a frame having a mouth at one end and a longitudinal slot extending rearwardly from said mouth, and a net-work covering for said frame.

5. A device of the character described comprising a frame open at either end and having a longitudinal slot therein, a rotatable element associated with said frame and in vertical alinement with said slot, and a receptacle secured to one end of said frame and in communication therewith.

6. A device of the character described comprising a frame open at either end and having a longitudinal slot therein, a rotatable element mounted in said slot, a receptacle secured to one end of said frame and in communication therewith, and a net-work covering for said frame.

7. A device of the character described comprising a frame embodying spaced longitudinal members, laterally spaced bands depending from said longitudinal members and in transverse relation thereto, a network covering carried by said bands, and said frame having a mouth at one of its ends.

8. A device of the character described comprising a frame embodying spaced longitudinal members having a slot therebetween, laterally spaced bands depending from said longitudinal members and in transverse relation thereto, a rotatable element secured in said slot intermediate its ends, a net-work covering carried by said bands, and said frame having a mouth at one of its ends.

9. A device of the character described comprising a frame embodying spaced longitudinal members having a slot therebetween, laterally spaced bands depending from said longitudinal members and in transverse relation thereto, a rotatable element secured in said slot intermediate its ends, a net work covering carried by said bands, a receptacle carried by one end of said frame in communication therewith, and the other end of said frame having a mouth therein communicating with said receptacle.

10. The combination with a boat having a boom, of a frame carried by said boom, network covering said frame, a guide within said frame for the passage of a line, a receptacle secured to one end of said frame and in communication therewith, and said frame having a mouth at its other end in communication with said receptacle.

11. The combination with a boat having a boom, of a frame carried by said boom, net-work covering said frame, a guide within said frame for the passage of a line, and said frame having a mouth at one end.

12. The combination with a boat having a boom, of a frame carried by said boom, net-work covering for said frame, said frame having a mouth at one end and a longitudinal slot extending rearwardly from said mouth, and a receptacle secured to the other end of said frame in communication therewith.

In testimony whereof I affix my signature in the presence of two witnesses.

WILLIAM F. MASSEY.

Witnesses:
DAVID A. PARSONS,
MICHAEL PUGH.